United States Patent
Schoenthal et al.

(10) Patent No.: US 7,392,425 B1
(45) Date of Patent: Jun. 24, 2008

(54) MIRROR SPLIT BRAIN AVOIDANCE

(75) Inventors: Scott Schoenthal, San Ramon, CA (US); Steven H. Rodrigues, Mountain View, CA (US); Alan L. Rowe, San Jose, CA (US); Joydeep sen Sarma, Mountainview, CA (US); Susan M. Coatney, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 11/485,544

(22) Filed: Jul. 12, 2006

Related U.S. Application Data

(63) Continuation of application No. 10/394,854, filed on Mar. 21, 2003, now Pat. No. 7,111,194.

(51) Int. Cl.
*G06F 12/16* (2006.01)
*G06F 11/08* (2006.01)

(52) U.S. Cl. .............................. 714/7; 711/162; 707/202

(58) Field of Classification Search ........................ None
See application file for complete search history.

(56) References Cited

U.S. PATENT DOCUMENTS 5,819,292 A 10/1998 Hitz et al.
5,963,962 A 10/1999 Hitz et al.
6,038,570 A 3/2000 Hitz et al.

OTHER PUBLICATIONS

U.S. Appl. No. 10/225,453, filed May 1, 2003, Stephan H. Strange et al.
U.S. Appl. No. 10/105,872, Steven Rodrigues et al.
U.S. Appl. No. 10/011,844, Abhijest Gole et al.
U.S. Appl. No. 10/378,400, Richard O. Larson et al.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.

*Primary Examiner*—Gary Portka
(74) *Attorney, Agent, or Firm*—Cesari and McKenna LLP

(57) ABSTRACT

A data storage system has two computers. Each computer is assigned to a set of data. Two copies of each set of data are maintained. A first copy is stored on a first set of disks and a second copy is stored on a second set of disks. Each time that a data is written by a computer, a label is written to each set of disks, the label having fields for a status of each computer, a first ordinal which is increased each time that a new data is written, and a time stamp giving a time at which the last write was performed. After failure of a computer, a processor determines, in response to reading the labels of the first set of disks and the second set of disks, the most up to date copy of the data assigned to the failed computer.

16 Claims, 10 Drawing Sheets

MIRROR SPLIT BRAIN AVOIDANCE

RELATED APPLICATIONS

This application is a continuation of U.S. Ser. No. 10/394,854 filed on Mar. 21, 2003, entitled MIRROR SPLIT BRAIN AVOIDANCE, now issued as U.S. Pat. No. 7,111,194 on Sep. 19, 2006.

FIELD OF THE INVENTION

The present invention relates to storage systems and, more specifically, to a technique for transferring service of a storage system during system outages, such as a disaster scenario.

BACKGROUND OF THE INVENTION

A storage system typically comprises one or more storage devices into which data may be entered, and from which data may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with a hard disk drive (HDD), a direct access storage device (DASD) or a logical unit number (lun) in a storage device.

Storage of information on the disk array is preferably implemented as one or more storage "volumes", defining an overall logical arrangement of disk space. The disks within a volume are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information may thereafter be retrieved to enable recovery of data lost when a storage device fails.

In the operation of a disk array, it is anticipated that a disk can fail. A goal of a high performance storage system is to make the mean time to data loss as long as possible, preferably much longer than the expected service life of the system. Data can be lost when one or more disks fail, making it impossible to recover data from the device. Typical schemes to avoid loss of data include mirroring, backup and parity protection. Mirroring stores the same data on two or more disks so that if one disk fails, the "mirror", disk(s) can be used to serve (e.g., read) data. Backup periodically copies data on one disk to another disk. Parity schemes are common because they provide a redundant encoding of the data that allows for loss of one or more disks without the loss of data, while requiring a minimal number of disk drives in the storage system.

The storage operating system of the storage system typically includes a RAID subsystem that manages the storage and retrieval of information to and from the disks in accordance with input/output (I/O) operations. Configuration management in the RAID subsystem generally involves a defined set of modifications to the topology or attributes associated with a volume or set of volumes. Configuration management is based on volume naming to identify the data (data set) that a client or operator wishes to access in accordance with a configuration management operation.

In the RAID subsystem, volumes are assigned names and identifiers (e.g., file system identifiers, fsids) in order to distinguish them from one another. A volume name is illustratively a string of characters (chosen by an operator) that is stored within a data set. Conventional procedures prevent a new volume from being created with the same name as a volume that is currently present in the system. However, if a volume data set is removed (for example, the disks that comprise the volume are disconnected from the system) a new volume may be created with its name. When the disks are reinserted into the system a name conflict arises; i.e., both volumes have the same name. A name conflict may also arise when a volume with a given name is disconnected from one system and connected to a different system that contains a volume with the same name.

In all cases, the system must be able to provide a unique name for each volume in order to avoid situations where configuration requests are sent to the wrong volume. Furthermore, once a resolution of the name conflict occurs, the resolution decision must be consistent each time the RAID subsystem is restarted. If one of the volumes with a conflicted name is removed and reattached to a system that does not already contain a volume with the conflicted name, the volume should revert to its original (non-conflicted) name. Although prior systems provide a mechanism for resolution of name conflicts, such resolution is not consistent across reboot operations nor do they utilize a scheme for determining the ordering in which conflicts are resolved based on attributes of the conflicted volumes.

In addition, it is desirable to resolve naming conflicts based on attributes of the conflicted volumes, e.g., native versus non-native, online vs. offline, active vs. failed. As used herein, native denotes a volume for which "primary" data service is provided by the current system. As such, data service migrates to the primary system when the primary system is capable of servicing data. Online denotes that the volume is configured to provide data service for clients, whereas offline denotes that the volume is configured to disallow data service. An offline state may be the result of manual operator intervention or self-configuration by the system as a result of configuration data associated with the volume. Active denotes a volume that is capable of providing data service and failed denotes that the volume is incapable of providing data service. Examples of this latter state include failures due to missing disks and corrupted configuration data.

It is generally desirable to increase the availability of the storage service provided by a storage system. The availability of the storage service may be increased by configuring a plurality of storage systems in a cluster, with the property that when a first storage system fails, a second "partner" storage system is available to take over the services and data otherwise provided by the failed storage system. The partner storage system provides these services and data by a "takeover" of resources otherwise managed by the failed storage system.

In an example of such a cluster configuration, nonvolatile memory (e.g., nonvolatile random access memory, NVRAM) is utilized by each storage system to improve overall system performance. Data written by a client is initially stored in the nonvolatile memory before the storage system acknowledges the completion of the data write request of the client. Subsequently, the data is transferred to another storage device, such as a disk. Each storage system in a cluster maintains a copy of the data stored in its partner's nonvolatile memory. Such nonvolatile memory shadowing is described in further detail in U.S. patent application Ser. No. 10/011,844 entitled Efficient Use of NVRAM during Takeover in a Node Cluster by Abhijeet Gole, et al., which is incorporated herein by reference as though fully set forth herein.

Nonvolatile memory shadowing ensures that each storage system in a cluster failover (CFO) configuration can takeover the operations and workload of its partner system with no loss of data. After a takeover by a partner system from a failed system, the partner storage system handles storage service requests that normally were routed to it from clients, in addition to storage service requests that previously had been handled by the failed storage system. The "surviving" partner storage system takes control of the failed storage system's data set and its network identity, and initiates storage service on behalf of the failed storage system.

However, a scenario in which both a storage system and its data set fails may occur under a variety of circumstances, including but not limited to, power failures at the system/data set site (a temporary failure) and catastrophic loss of the physical location (a permanent failure). A scenario of this latter form (termed a disaster scenario) is infrequent and highly disruptive to the client application environment. Typically, declaration of a disaster and the invocation of a procedure to resolve the disastrous situation occur under operator control.

As noted, mirroring (such as volume mirroring) stores the same data (data set) on two or more disks so that if one disk fails, the "mirror" disk can be used to serve (e.g., read) the data set. The goal of volume mirroring is to be able to continue operating with either data set after some equipment failure precludes the use of or access to the other data set. A storage system manages the mirrored relationship between the data sets, i.e., the system recognizes that the data sets constitute a mirrored pair and thus maintains consistency of data between the two data sets in accordance with a conventional mirror resynchronization procedure. An example of a mirror resynchronization procedure is described in U.S. patent application Ser. No. 10/225,453, titled Resynchronization of Mirrored Storage Devices, which application is hereby incorporated by reference as though fully set forth herein.

A problem that may arise with such a mirrored volume configuration involves a "split-brian" situation wherein two divergent "views" of the data sets are created. For example, assume there are two collections of disks storing the data sets for a volume, wherein the data sets are represented by DS1 and DS2. The intent is that the data sets stored on those disks be completely identical. When one data set (e.g., DS2) is brought into the mirrored volume after being offline, i.e., physically removed from the system for a period of time, a comparison operation is performed to determine whether the data sets (DS1 and DS2) have divergent views. This determination is illustratively performed based on an understanding of how the divergent views may arise.

Assume further that DS1 and DS2 of the mirrored volume are both online and functioning when DS2 is lost. In this context, DS2 is lost as a result of being physically removed from the system for a period of time either by disconnecting the disks of the volume or shutting down power to the disks. The effect of DS2 being lost is that DS1 moves forward (i.e., data is written to DS1). Subsequently, the system is halted and DS2 is reattached to the storage system as DS1 is detached from that system. The system is then restarted. As a result, all client updates that had occurred to DS1 during the time that DS2 was offline are lost and new data written by the clients is now stored on DS2 such that DS2 moves forward. The storage system is then halted, DS1 is reattached to the system and the system is restarted. This is an example of a classic split-brain situation: the data sets are created from a common source (storage system), move in two different (divergent) directions and then come together again.

Typically, the problem arises after DS1 has moved forward. That is, in response to detaching DS2 from the storage system for a period of time, DS2 should not be thereafter allowed to take the place of DS1 when it is subsequently reattached to the system. If both data sets are allowed to come back online together, there are two divergent views of the data sets and a decision has to be made as to which data set is allowed to move forward. Realistically, DS1 is the valid copy of the data set, whereas DS2 is invalid. This split-brain situation is independent of clustering and reflects a situation that may arise due to periodic maintenance of a system, as well as transient connectivity failures in the system. Tools are therefore needed to efficiently bring the divergent views of the data sets in synchronization (to a common state) without having to examine the content of each independent data set. Accordingly, it is desirable to provide a technique that avoids (prevents) a mirror split-brain situation.

SUMMARY OF THE INVENTION

The present invention overcomes the disadvantages of the prior art by providing a technique that includes a set of procedures utilized during the transfer of service of a failed storage system to a surviving storage system of a cluster failover (CFO) configuration during a system outage, such as a disaster scenario. The procedures are executed by a RAID subsystem of the surviving storage system during disaster takeover, storage healing and node restart operations.

Broadly stated, in the disaster scenario, the RAID subsystem of the surviving storage system splits the surviving data sets of the failed system to allow an operator the ability to compare the data sets subsequent to healing of the disaster. To that end, the RAID subsystem assigns a new name to each taken-over volume instance to prevent recombination subsequent to storage healing. The subsystem also retains the state associated with individual volumes that existed prior to the disaster. The volume of the failed system must also be brought online regardless of its state in order to complete a successful disaster takeover. As used herein, the volume is a distinguished volume containing configuration information that defines the configuration of the remaining volumes, their data services, shared cluster management services and the underlying hardware platform elements.

Subsequent to the disaster, the cluster undergoes a healing process that may involve either a gradual restoration of service or a complete restoration of service to the failed system site. Storage healing, in this context, denotes that when the failed data set co-located with the failed system is healed, it is not made available to clients without operator intervention. The failed data set is preferably marked "out-of-date" subsequent to healing. In addition, the system is able to select the correct volume (from the surviving data set) given the choice of two possible volumes (the surviving data set and the "now-healed" failed data set). Furthermore, the original surviving data set is assigned a base ordinal in order to prevent an unexpected renaming of the data set (in the event the failed data set reappears) and a naming conflict that may result in client interruption.

According to the inventive technique, the RAID subsystem resolves the conflict in which two separate volumes have the same distinguishing name using a volume name conflict resolution procedure. The conflict resolution procedure ensures that the reappearing data set is uniquely renamed in a manner that is consistent with the previous volume name. As described herein, volume naming is accomplished through the use of ordinals. Each volume is assigned an ordinality value that defines the resolved ordering of named conflicts among two or more volumes. Initially, each volume is assigned an ordinality of zero. The conflict resolution procedure implements a coarse volume precedence scheme based on the state of the volume. If two or more volumes at the same precedence level have conflicting names, an ordinal claim value is used as a tiebreaker. The ordinal claim is a time stamp that indicates the point in time when the volume most recently claimed the base (0) ordinal. The volume with the most recent ordinal claim is given precedence over volumes with less recent claims. The remaining volumes are assigned ordinals in a monotonically increasing order according to precedence.

When the unique volume names, including the assigned ordinals, are exported to an operator (via a user interface) or to a client (via a share that can be mounted), it must be ensured that these names are consistent across configuration change or reboot operations. The present invention ensures such consistency by persistently storing the unique names of the renamed volumes (i.e., the ordinal claim data) within label state information stored on the volume to maintain that consistency. Each time a label is updated for a volume with a base ordinal setting, the ordinal claim data is updated to the current system time stamp. By storing the ordinal name assignments within the labels of disks, the naming assignment is persistently stored across reboot and configuration management (changes) operations. This ensures that in the case of multiple volumes having the name, the ordinal assignments are maintained.

Advantageously, the procedures described herein prevent the possibility that clients accessing the storage system will "see" out-of-date versions of the data either during transfer of service of the system during the disaster scenario or subsequently after the storage system is healed and service on the failed system has been restored. To that end, the inventive technique defends against silent access to out-of-date data subsequent to a disaster takeover, while providing continuity in the naming and identity of the surviving data set. Ordinal assignment of a volume is dynamic, persistent across reboot operations through the use of an ordinal claim and precedence settings provide a deterministic method for determining ordinal assignment. Mirroring operations continue uninterrupted if the surviving data set is up-to-date sufficient to resynchronize with potential source and target mirrors. In addition, healing of the storage subsystem instantiates both the surviving and failed data sets for comparison and resolution of conflicts. The inventive technique described herein handles partial failures of the storage system, i.e., handles partial or complete loss of the storage connection between the systems.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
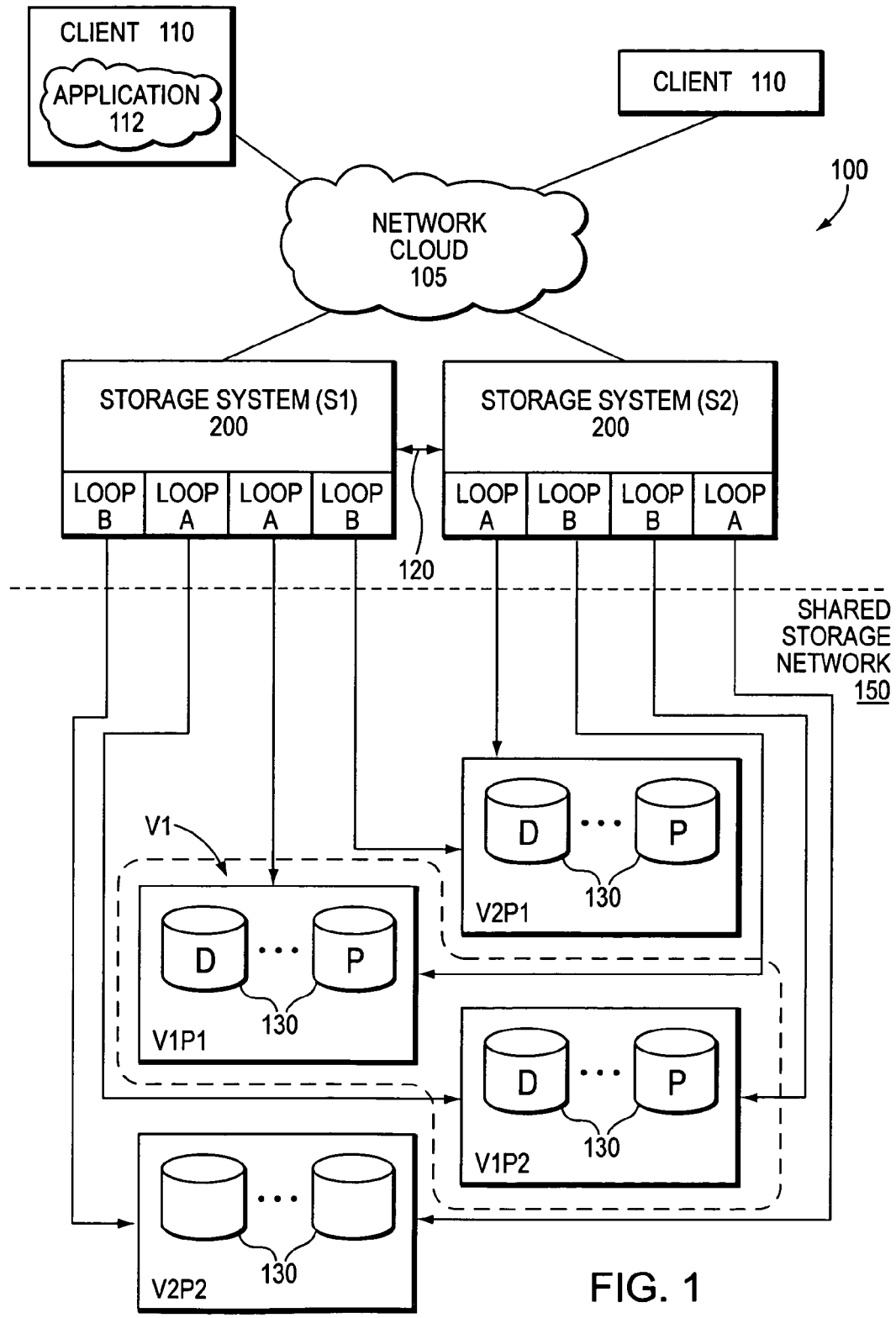
FIG. 1 is a schematic block diagram of an environment including a cluster failover (CFO) system configuration that may be advantageously used with the present invention.

FIG. 1 is a schematic block diagram of a cluster failover (CFO) system configuration 100 comprising a pair of storage systems (S1, S2) 200 coupled by a dedicated, memory based cluster interconnect 120 that may use a variety of different technologies to provide a private communications mechanism. The clustered storage systems are also coupled to a shared point-to-point storage network 150, such as a storage area network (SAN) configured to store information. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD.

A plurality of clients 110 connects to each storage system 200 over a network cloud 105. The network cloud 105 may comprise any acceptable networking architecture including, for example, a local area network (LAN), a wide area network (WAN), a virtual private network (VPN) or any other networking architecture including, for example the Internet. Illustratively, the network cloud 105 may be embodied as an Ethernet network or a Fibre Channel (FC) network. The clients 110 may be general-purpose computers configured to execute applications 112. Each client 110 may communicate with the storage system over network 105 by exchanging discrete frames or packets of data according to pre-defined protocols, such as the Transmission Control Protocol/Internet Protocol (TCP/IP).

Moreover, the client 110 may interact with the storage system 200 in accordance with a client/server model of information delivery. That is, the client may request the services of the storage system, and the system may return the results of the services requested by the client, by exchanging packets over the network cloud 105. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel Protocol (FCP), when accessing information in the form of blocks.

Storage of information is preferably implemented as one or more storage "volumes" that comprise a collection of physical disks 130 cooperating to define an overall logical arrangement of disk space on the volume(s). Each volume is generally, although not necessarily, associated with its own file system. Each storage system 200 and its volumes are hereinafter referred to as a node. Each volume stores a copy of a data set, such that each storage system has one copy of its data set and one copy of the other storage system's data set. It should be understood that while only two storage systems and two volumes are shown in the illustrative CFO configuration, it is expressly contemplated that multiple storage systems and volumes may be connected in a cluster configuration and provide takeover for each other.

The disks within a volume/file system are typically organized as one or more groups, wherein each group is operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. A RAID-4 level implementation is illustratively described herein, although it should be understood that other types and levels of RAID implementations may be used in accordance with the inventive principles described herein.

Each storage system 200 includes a plurality of data access ports that enables the system to connect to a plurality of storage loops. In the illustrative embodiment, each storage system includes Loop A and Loop B port connectors that couple to the disks over an I/O interconnect arrangement, such as a conventional high-performance, FC serial link loop topology. Each storage system is connected to both its volume and the volume of its "partner" storage system over the FC storage loops. The storage system connected via its A port to a volume is a primary storage system for the data stored on that volume.

In accordance with failover methodologies, should a storage system in a CFO configuration fail, the partner storage system initiates a takeover of the volume(s) that are normally serviced by the failed storage system. Thus, for example, if storage system S1 should fail, then storage system S2 would take over the operations and service data access requests to those volumes normally serviced by S1. It should be noted that the network topology is exemplary only that the principles of the present invention can be implemented using a variety of storage network configurations. That is, it is expressly contemplated that alternate storage network topologies may be utilized, e.g., via switches, using external RAID boxes, etc.

Figure 2:
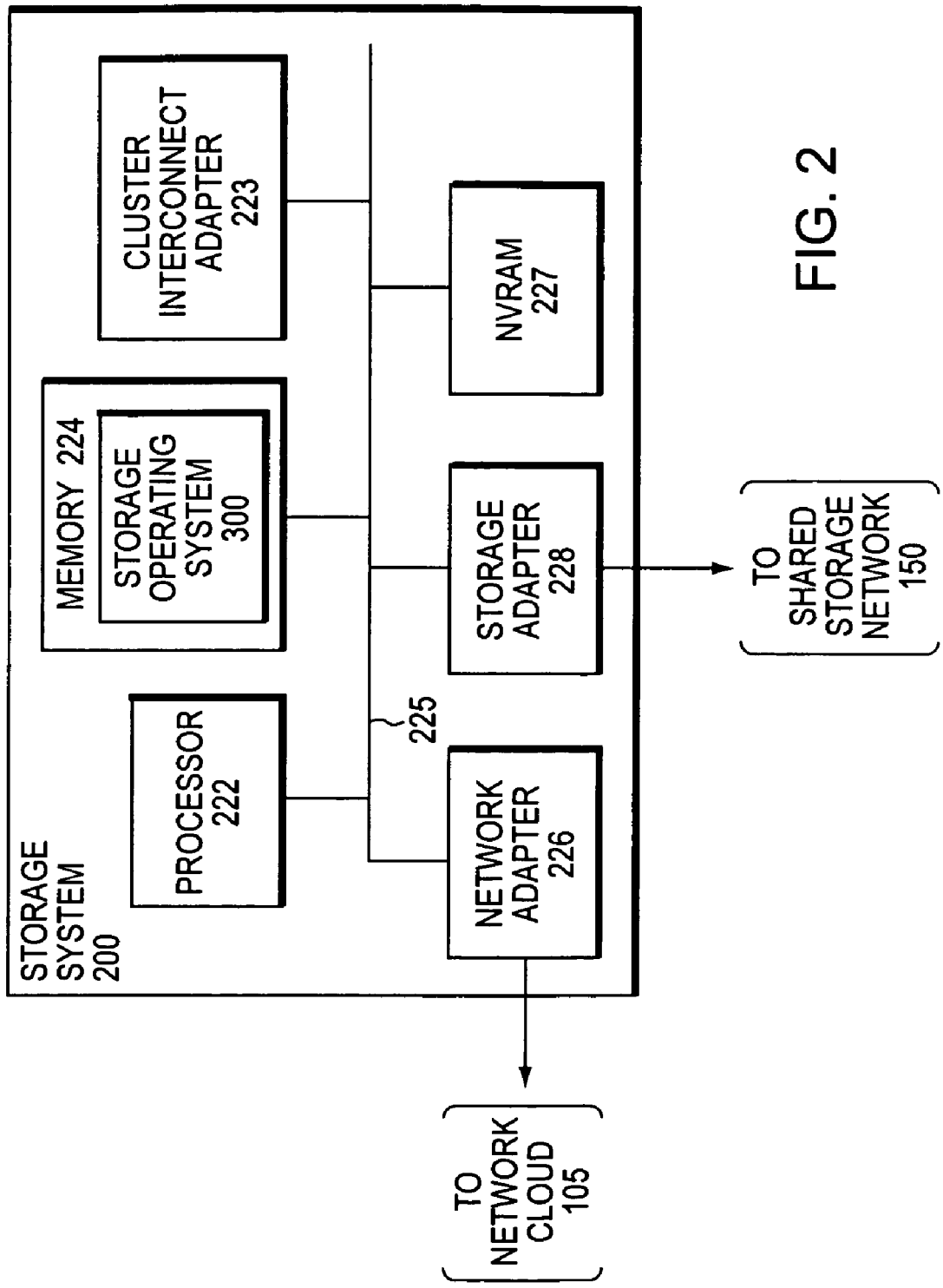
FIG. 2 is a schematic block diagram of a storage system that may be advantageously used with the present invention.

FIG. 2 is a schematic block diagram of storage system 200 that may be advantageously used with the present invention. The storage system is a computer that provides storage service relating to the organization of information on storage devices, such as disks 130. The storage system 200 comprises a processor 222, a memory 224, a network adapter 226 and a storage adapter 228 interconnected by a system bus 225. The storage system 200 also includes a storage operating system 300 that preferably implements a file system to logically organize the information as a hierarchical structure of directories, files and virtual disks (hereinafter "blocks") on the disks.

In the illustrative embodiment, the memory 224 comprises storage locations that are addressable by the processor and adapters for storing software program code and data structures associated with the present invention. The processor and adapters may, in turn, comprise processing elements and/or logic circuitry configured to execute the software code and manipulate the data structures. Storage operating system 300, portions of which are typically resident in memory and executed by the processing elements, functionally organizes the system 200 by, inter alia, invoking storage operations executed by the storage system. It will be apparent to those skilled in the art that other processing and memory means, including various computer readable media, may be used for storing and executing program instructions pertaining to the inventive technique described herein.

The storage system also includes a cluster interconnect adapter 223 and a non-volatile random access memory (NVRAM) 227. Network adapter 226 comprises the mechanical, electrical and signaling circuitry needed to connect the storage system 200 to a client 110 over the network cloud 105. Storage adapter 228 cooperates with the storage operating system 300 executing on the system 200 to access information stored on the disks 130 in response to a request by a user (or client).

To facilitate access to the disks 130, the storage operating system 300 implements a write-anywhere file system that cooperates with virtualization modules to "virtualize" the storage space provided by disks 130. The file system logically organizes the information as a hierarchical structure of named directories and files on the disks. Each on-disk file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system including, for example, a write in-place file system, may be enhanced for use in accordance with the inventive principles described herein. As such, where the term "WAFL" is employed, it should be taken broadly to refer to any storage operating system that is otherwise adaptable to the teachings of this invention.

Figure 3:
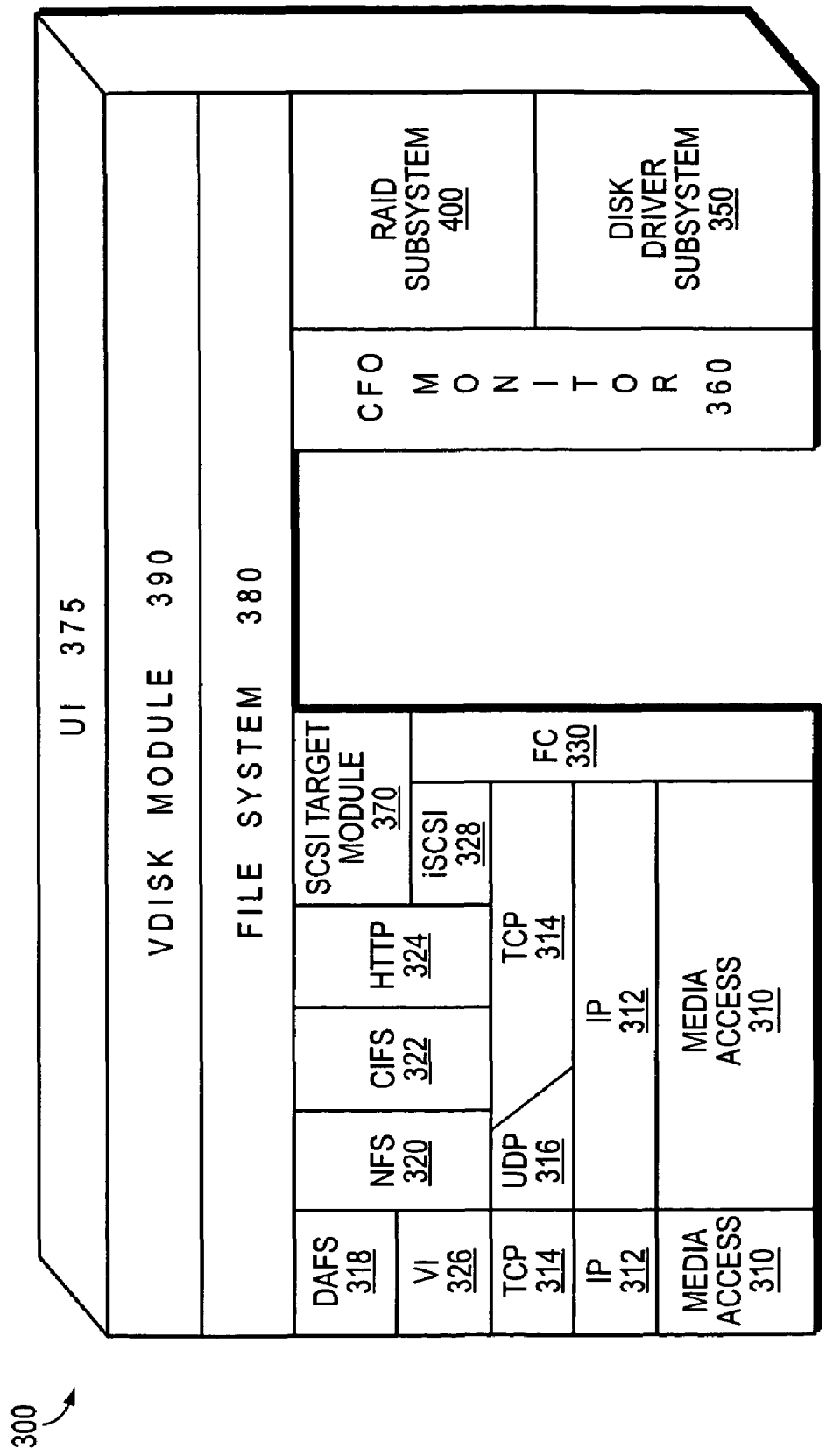
FIG. 3 is a schematic block diagram of a storage operating system that may be advantageously used in the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318.

An iSCSI driver layer 328 provides block protocol access over the TCP/IP network protocol layers, while a FC driver layer 330 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage device manager embodied as a RAID subsystem 400 that manages the storage and retrieval of information to and from the volumes/disks in accordance with I/O operations, and a disk driver subsystem 350 that implements a disk access protocol such as, e.g., the SCSI protocol.

Bridging the disk software layers with the integrated network protocol stack layers is a virtualization system that is implemented by a file system 380 interacting with virtualization modules illustratively embodied as, e.g., vdisk module 390 and SCSI target module 370. The vdisk module 390 is layered on the file system 380 to enable access by administrative interfaces, such as a user interface (UI) 375, in response to a user (system administrator) issuing commands to the storage system. The SCSI target module 370 is disposed between the FC and iSCSI drivers 328, 330 and the file system 380 to provide a translation layer of the virtualization system between the block (lun) space and the file system space, where luns are represented as blocks. The UI 375 is disposed over the storage operating system in a manner that enables administrative or user access to various layers and subsystems, such as the RAID subsystem 400.

The file system is illustratively a message-based system that provides volume management capabilities for use in access to the information stored on the storage devices, such as disks. That is, in addition to providing file system semantics, the file system 380 provides functions normally associated with a volume manager. These functions include (i) aggregation of the disks, (ii) aggregation of storage bandwidth of the disks, and (iii) reliability guarantees, such as mirroring and/or parity (RAID). The file system 380 illustratively implements the WAFL file system having an on-disk format representation that is block-based using, e.g., 4 kilobyte (kB) blocks and using index nodes (inodes) to identify files and file attributes (such as creation time, access permissions, size, and block location). The file system uses files to store metadata describing the layout of its file system; these metadata files include, among others, an inode file. A file handle, i.e., an identifier (ID) that includes an inode number, is used to retrieve an inode from disk.

Operationally, a request from the client 110 is forwarded as a packet over the network cloud 105 and onto the storage system 200 where it is received at the network adapter 226. A network driver (of layer 310 or layer 330) processes the packet and, if appropriate, passes it onto a network protocol and file access layer for additional processing prior to forwarding to the file system layer 380. Here, the file system generates operations to load (retrieve) the requested data from disk 130 if it is not resident "in-core", i.e., in the memory 224. If the information is not in memory, the file system 380 indexes into the inode file using the inode number to access an appropriate entry and retrieve a logical volume block number (VBN). The file system then passes a message structure including the logical VBN to the RAID subsystem 400, which maps that logical number to a disk block number (DBN) and sends the latter to an appropriate driver (e.g., SCSI) of the disk driver subsystem 350. The disk driver accesses the DBN from disk 130 and loads the requested data block(s) in memory 224 for processing by the storage system. Upon completion of the request, the storage system (and operating system) returns a reply to the client 110 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 200 in response to a request issued by client 110. Moreover, in another alternate embodiment of the invention, the processing elements of adapters 226, 228 may be configured to offload some or all of the packet processing and storage access operations, respectively, from processor 222, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server or filer) or general-purpose computer, including a standalone computer or portion thereof, embodied as or including a storage system 200. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
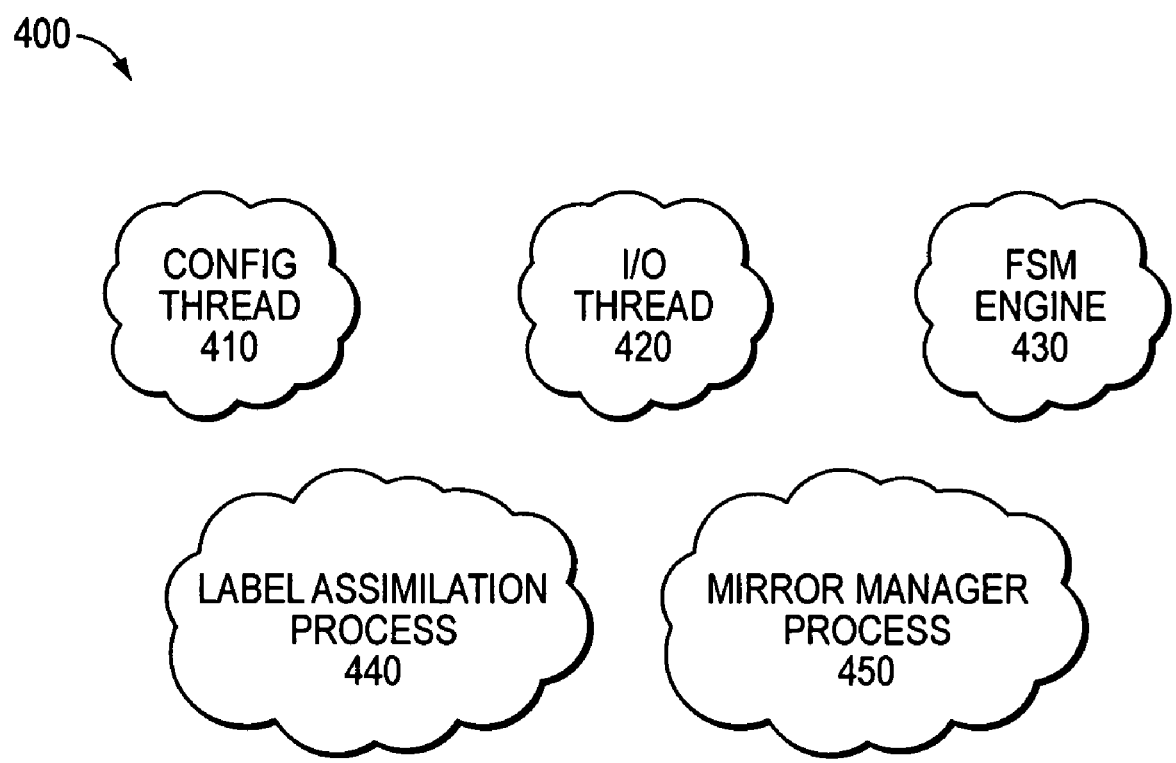
FIG. 4 is a schematic block diagram illustrating processes and threads of a RAID subsystem of the storage operating system of FIG. 3.

The present invention is implemented in the context of a configuration management framework used to implement the RAID subsystem 400 in the storage operating system 300. In a preferred embodiment, the configuration management framework provides an object-oriented approach to RAID configuration management, as described herein with respect to an implementation of the RAID subsystem. FIG. 4 is a schematic block diagram illustrating one or more modules or processes and threads of the RAID subsystem 400, wherein each process has, among other things, a (virtual) memory address space, executable code and data. A process is started with a single thread, but can create additional threads from any of its threads. The threads execute in the same memory address space and can therefore work concurrently on shared data. For example, an instantiator module implements a configuration (config) thread 310 adapted to maintain relationships among and invoke behaviors of decomposed software components (RAID objects) that collectively form the behaviors associated with a collection of (RAID) volumes on the storage system. In addition, an I/O manager module implements an I/O thread 420 configured to issue I/O transaction requests from the RAID subsystem to the disk driver subsystem and, upon completion, process the results.

A finite state machine (FSM) module or engine 430 is used to arbitrate a set of events and states that a process or thread of the RAID subsystem may encounter. Transactional semantics isolate the behavior of state changes in the RAID subsystem from concurrent I/O operations. The framework provides a two-phase commit procedure, coordinated with updates to on-disk configuration data (labels). Errors during disk label updates are handled by aborting the transaction, releasing partially committed data and unwinding any pending state transitions. A state notification mechanism integrated with the FSM engine 430 propagates state changes through the threads in order to provide a coordinated behavior.

According to the configuration management framework, a volume comprises the aggregate behavior of a number of RAID objects. Each RAID object (object) comprises operational code and static state, such as configuration information, relating to the topology of the underlying physical storage devices, e.g., disks 130. The objects are organized into a configuration tree with configuration interfaces defining a set of services provided by one or more processes of the RAID subsystem. Although the objects may be implemented in accordance with an object-oriented programming paradigm, the present invention is not limited to such an implementation. More broadly, the objects of the configuration tree refer to abstract entities representing a logical combination/configuration of the disks. That is, the objects are used to present a view of the underlying topology of the storage array managed by the RAID subsystem.

Figure 5:
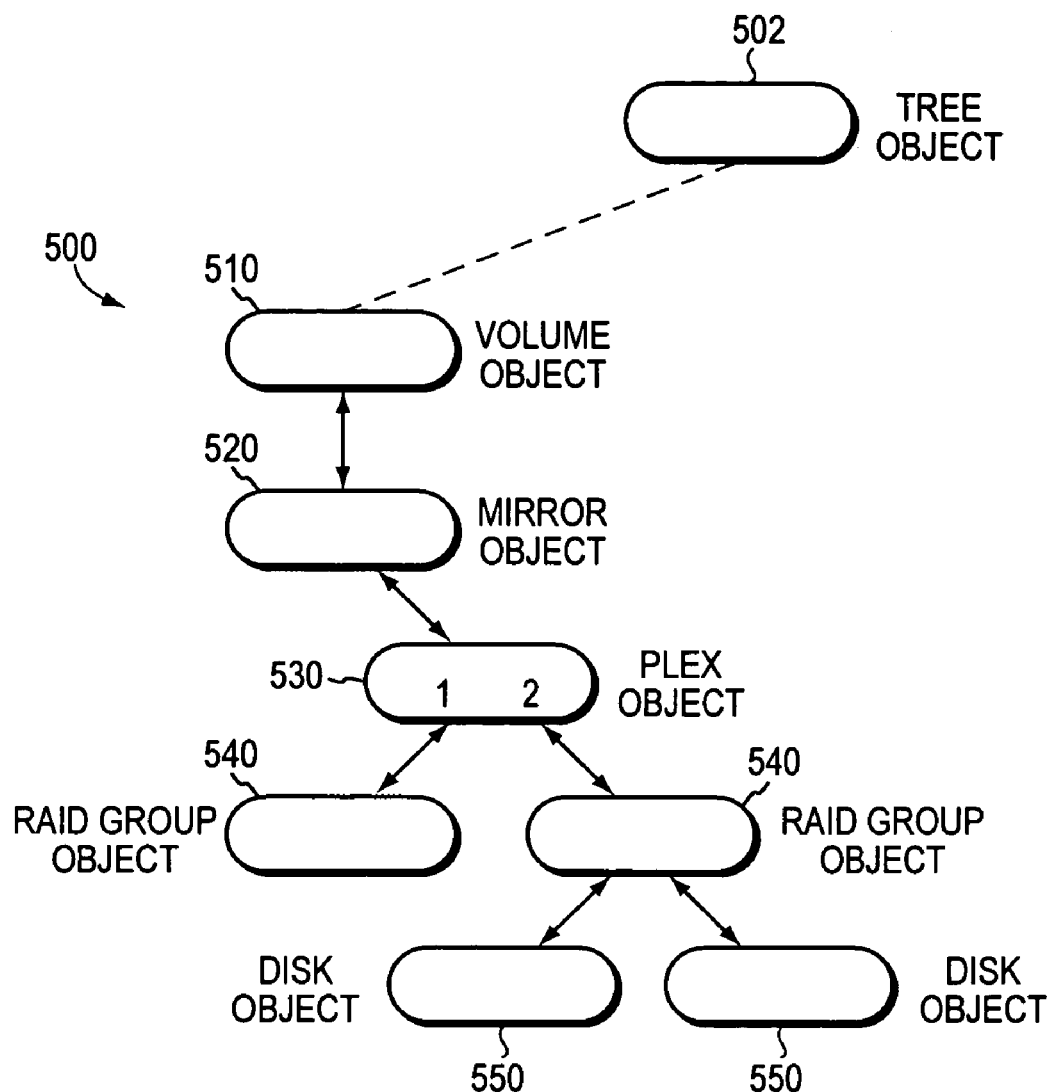
FIG. 5 is a schematic block diagram of an in-core representation of an embodiment of a RAID configuration tree structure in accordance with a configuration management framework that may be advantageously used in the present invention.

FIG. 5 is a schematic block diagram of an in core representation of an embodiment of a RAID configuration tree structure 500 in accordance with the configuration management framework. The configuration tree 500 comprises a plurality of objects arranged by the RAID subsystem into levels that cooperate to organize one or more physical disks into a single logical volume. References between objects (e.g., between a superior parent object and each of its subordinate children objects) are bi-directional memory address pointers that enable each child to reference its parent (and vice versa). These pointers are part of the metadata stored within each of the objects.

Objects have an associated type, with each object type providing its own implementation of the configuration interfaces. A volume is organized into a hierarchical configuration tree of objects that includes a tree object 502 responsible for coordinated behavior with the file system and a volume object 510 responsible for managing the RAID aspects of volume management. Specifically, the volume object 510 represents the (WAFL) file system at the highest level (i.e., root node) of the configuration tree 500. To that end, the volume object 510 stores metadata that describes a volume/file system, wherein the metadata includes information such as the name of the volume and address range (in physical blocks) of the volume. The name of the volume resides in a volume namespace that is exported by the UI 375 of the storage operating system 300. The logical address space of the file system is mapped to the physical (block) address space in the RAID subsystem 400.

The configuration tree 500 and, in particular, the volume object 510 represent a logical disk that is presented to the file system by the RAID subsystem as a container for the file system to store its data. That is, the objects of the configuration tree are organized to create an address space that resembles a single volume but, in reality, comprises a plurality of physical disks. In this context, the volume object 510 is equivalent to the tree object 502, wherein the tree object stores additional metadata about the logical volume that is presented to the file system. This additional metadata includes the type (level) of parity implementation configured for the particular volume (e.g., RAID-4, RAID-0, mirror_RAID-4, mirror_RAID-0). Since the tree object is a one-to-one representation of the volume, the additional metadata stored in the tree object includes redundant information about the volume, such as its name and physical address/block range.

A next object level comprises a mirror object 520 that is responsible for coordinating one or more copies of the volume (termed plexes) in support of data mirroring. In synchronous data mirroring, two mirror copies are provided that are at all times synchronized. That is, changes to the data in one mirrored copy are immediately reflected in the other mirrored copy. The two identical mirrored copies have matching address spaces that are within the volume address space and that provide identical synchronized full copies of the data in the volume.

A plex object 530 is responsible for managing an instance of a copy of volume data and thus represents each mirrored copy within another object level of the configuration tree. Whereas the mirror object 520 stores metadata that is used to coordinate one or more copies (or plexes) of the volume in support of data mirroring, each plex object 530 stores metadata that is used to manage an instance of a copy of volume data. The plex object may include an ordinal placement (e.g., 1, 2) indicating that, for example, a first part (1) of the address space is associated with a particular RAID group and that a second part (2) of the address space is associated with another RAID group.

A next object level comprises one or more RAID group objects 540 per plex object. Each RAID group object 540 contains metadata that provides data protection and I/O coordination over a set of disks. The metadata of the RAID group object includes information such as the number of disks within the RAID group and the address (block) range of each disk within the RAID group. In this context, a RAID group is defined as a number of disks and the address/block space associated with those disks. Finally, there is another object level comprising one or more disk objects 550 per RAID group object, wherein each disk object 550 contains metadata that provides data access to the physical disks 130.

The configuration tree 500 is constructed in the memory 224 of the storage system 200 by a label assimilation process 440 of the RAID subsystem 400. According to the assimilation process, each disk associated with a volume includes a label that describes its placement and association with that volume. The on-disk label is, in essence, self-describing information for each disk that is actively attached to the storage system 200. The labels are used to dynamically assemble the disks into a volume and to construct an in core configuration tree 500 for that volume, starting from the disk object level up to the volume object level. Therefore, a label on a disk identifies that disk's participation in a RAID group and, furthermore, that group's association with plex, mirror and, ultimately, volume objects in the configuration tree. The label is located in a well-known location of the disk so that it can be queried by the RAID subsystem in accordance with, e.g., a discovery process during a boot operation.

Each object type instance of the configuration tree 500 comprises the following components: service interfaces, committed transactional state, pre-committed transactional state and non-transactional state. The service interfaces comprise an application programming interface (API) that the object exports to other software components. In the illustrative embodiment, the service interfaces include initialization and destruction, child object management (add, replace), online/offline, transaction management (join, commit, abort, label I/O, state change notify), virtual block management, and I/O handling (context creation/deletion, resource management, I/O throttling). Each object type defines the commit, pre-committed, and non-transactional state that it holds. The transaction management interfaces are provided as a mechanism to create and modify transactional state in a manner that is coordinated across all objects in a volume.

The basic flow of control starts with a configuration management operation issued by, e.g., the file system 380 and received by the RAID subsystem 400. The file system passes the configuration management operation in the form of a message request that specifies a target volume and defines a named operation with specific parameters. The configuration thread 410 of the RAID subsystem receives the request and determines the object (e.g., volume, RAID group) of the configuration tree 500 for the volume to which the request is directed. The configuration thread then locates the tree object 502 for the volume and invokes relevant configuration operations using service interfaces of the appropriate object. When a service interface is invoked, the object is transparently joined to the request prior to activation of the interface. Joining of an object to a request results in copying of the currently committed state into a pre-committed state area (called the trans area of the object). The trans area is a portion of memory that records changes to the object that are pending commitment. The service interface makes its changes to the trans area. If the changes to the object result in a change of the state of the object, the FSM engine 430 is invoked.

The FSM engine 430 provides a critical component in managing the interrelationship between objects in a RAID volume. Specifically, the FSM engine defines the state/event pairs that are "legal" and, for each state/event, provides a mechanism to implement the invocation and determine any subsequent state transitions. In addition, the FSM engine provides tracing mechanisms to track the set of transitions that have occurred and provides object notification for pre-committed and committed state transitions. More specifically, the FSM engine 430 is responsible for determining the new state of the object (based upon a per object type state/event table) and invoking the state notification interface of its superior object in the volume hierarchy. The FSM engine includes an upward notification mechanism (e.g., from child to parent object) to notify the parent object about a state change in the child object.

When the configuration request completes all service interface invocations, it requests a label commit operation to persistently store the modified state. The label commit pulls data from the trans area in order to construct its new version of the label data. Label commit is deemed to be successful only if all labels in a plex can be successfully written. Once all labels have been successfully written, each object that has been joined to the request is responsible for copying its trans area data back to the committed state portion of the object. If labels are not successfully written, the trans area is discarded, any disk failures are identified and resulting configuration changes are initiated, the successfully written labels are re-written with the previous state, and the original configuration request is retried.

Referring again to FIG. 1, the CFO system configuration 100 allows graceful failover of clients from one storage system 200 to another in the event that a system fails. This system configuration is directed to increasing the availability of the storage service in the face of hardware failures, e.g., disk shelf failures, hardware component failures and failure of the communication lines to the shared storage network. Monitoring facilities within each of the storage systems (e.g., a CFO monitor 360 of FIG. 3) detect when one of the systems fails and gracefully migrate clients from the failed system to the surviving system. For example, messages are exchanged over the cluster interconnect 120, between the storage systems 200 and, in particular, between the monitoring facilities executing on the systems, to enable detection of a failure of one of the systems.

In a typical CFO configuration, the nodes are physically co-located in a relatively common area because of distance limitations associated with the cluster interconnect and storage network. In the illustrative embodiment, these distance limitations are relaxed to allow an extension of distances separating the nodes that ranges from tens of meters to hundreds/thousands of meters. This extension introduces a new class of failure involving complete severance of communication between the two nodes. In the CFO configuration, each storage system has redundant storage paths to both its storage and its partner's storage (e.g., primary and secondary storage loops). A determination (from a CFO monitoring perspective) is made as to whether a true failure has occurred to one of the storage systems 200 or whether the systems are functioning but communication between them has been severed.

The CFO monitor 360 and its facilities are used to determine whether a failure has occurred in a storage system of a cluster. For example, heart beat messages are exchanged over the cluster interconnect 120 between the storage systems, as well as over the shared storage network 150 by reading/writing blocks in mailbox mechanisms using the disks. Thus, if interconnect status between the systems is lost (as result of non-reception of heart beat messages over the interconnect), yet the blocks in the disk mailbox mechanisms can be accessed, then it can be determined that the storage systems are functioning even though the cluster interconnect between them may be severed. In this case, a CFO takeover does not occur.

The disk mailbox mechanisms enable communication between the storage systems 200 within the shared storage network 150. A location is designated on specific portions of each volume coupled to each system that is used to exchange status among the storage systems. A disk mailbox mechanism that may be advantageously used with the present invention is described in U.S. patent application Ser. No. 10/378,400 titled, System and Method for Coordinating Cluster State Information, by Larson et al., which application is hereby incorporated by reference as though fully set forth herein. Broadly stated, each mailbox location on the volumes includes two blocks, one for reading information and the other for writing information. For example, the owner storage system of the mailbox location stores (writes) status information to the write block and its partner storage system retrieves (reads) that status from the read block. Each partner system periodically polls its associated read block to acquire current status associated with the owner system.

The RAID subsystem 400 makes a determination as to which blocks of the volume are available to the CFO monitor 360 for use as the mailbox mechanism. For example, in response to a boot operation of the storage system, the RAID subsystem identifies the root volume and, in particular, two locations on that volume: the disk having VBN 0 and the parity disk associated with the disk having VBN 0. As used herein, the root volume is a distinguished volume containing configuration information that defines the configuration of the remaining volumes, their data services, shared cluster management services and the underlying hardware platform elements. Illustratively, these two disks (locations) per plex function as the mailbox disks. In a non-mirrored configuration, there are four disks used for mailbox communication in a CFO configuration, two disks per storage system. Each storage system of the CFO configuration 100 periodically reads and writes to the mailbox disks. Using various communication techniques (via the cluster interconnect and/or the storage network mailbox) a determination can be made as to whether a storage system has failed so that a CFO takeover operation should occur. The CFO monitor 360 of the storage operating system 300 executing on each system makes this determination.

The CFO monitor 360 is a collection of threads that resides outside of the file system 380, the RAID subsystem 400 and the disk driver subsystem 350, but that has interfaces into all of those subsystems that enables it to collect configuration information and issue read/write operations to the disks 130. In addition, the CFO monitor has an interface into a driver (not shown) of the cluster interconnect adapter 223 that enables it to read/write the cluster interconnect 120 between the storage systems 200. For example, the CFO monitor threads have an interface into the disk driver subsystem 350 that enables them to issue "raw" read and write operations to blocks on the disks 130 without intervention of the file system. The locations of those raw disk blocks are determined through requests to the RAID subsystem 400 for configuration information and location of the mailbox disks. To that end, the CFO monitor has a low-level configuration interface into the RAID subsystem to determine the locations of the blocks on the mailbox disks. This configuration interface allows access by the CFO monitor 360 into a repository of configuration information maintained by the RAID subsystem for use by other components of the storage operating system, including the UI 375.

Therefore, the CFO monitor 360 determines whether a partner storage system is functioning or failed by, e.g., examining the information exchanged between the storage systems using the mailbox mechanism. This information is embodied in a message having various fields that provide, among other things, information with respect to the identity of the storage system, a time stamp, a sequence number issued by the owner storage system and a sequence number issued by the partner storage system. These messages are not only exchanged via the mailbox but also over the cluster interconnect and are used by the CFO monitor to determine whether the partner storage system is "alive enough" to be writing data to the storage devices. The assumption is that if a system is alive enough to write to the disks, then it is alive enough to service its clients.

The goal of the CFO configuration is to prevent/avoid a single point of failure with respect to storage service provided to clients. However, in a non-mirrored volume configuration, the data, including the disk shelves and its constituent disks, represent single points of failure. As noted, single disk failures can be corrected through conventional RAID techniques; however, multiple disk failures are typically not correctable through such techniques. Therefore, volume mirroring may be utilized to provide redundant storage of information and thereby increase the availability/reliability of the data.

Volume mirroring provides pairs of data sets, wherein each data set is represented by a plex of the configuration tree of the volume. For example, mirrored volume V1 includes data set V1P1 and data set V1P2. V1P1 and V1P2 have their own separate data paths coupled to storage system S1; similarly, V2P1 and V2P2 have their own separate data paths coupled to system S2. The controlling system S1 (and S2) manages the mirrored relationship between V1P1 and V1P2 (and V2P1 and V2P2). That is, the controlling system recognizes that the data sets constitute a mirrored pair and thus maintains consistency of data between the two data sets in accordance with a conventional mirror resynchronization procedure. As noted, an example of a mirror resynchronization procedure that may be advantageously used with the present invention is described in U.S. patent application Ser. No. 10/225,453, titled Resynchronization of Mirrored Storage Devices, which application is hereby incorporated by reference.

A problem that may arise with such a mirrored volume configuration involves a split-brain situation wherein two divergent "views" of the data sets are created. For example, assume there are two collections of disks storing the data sets for a volume (V1), wherein the data sets are represented by V1P1 and V1P2; these data sets are intended to be completely identical. Assume further that one data set (e.g., V1P2) is brought into the mirrored volume after being offline, i.e., physically removed from the system for a period of time. A determination is made as to whether the data sets (V1P1 and V1P2) have divergent views.

If both data sets are allowed to resume online together, there may be two divergent views of the data sets and, if so, a decision has to be made as to which data set is allowed to move forward. Configuration state (i.e., the on-disk label state) reflects a view that both of the data sets have the same name, the same configuration tree ID and the same file system ID. Tools are therefore needed to determine if the views of the data sets are divergent and, if so, bring the divergent views in synchronization (to a common state) without having to examine the content of each independent data set. In accordance with an aspect of the invention, one such tool is mirror voting, wherein a realistic decision is made as to which data set represents valid data for the volume.

As noted, each disk 130 contains a label that describes its containing RAID group, plex, mirror and volume. The label assimilation process 440 scans all disks and tries to assemble a coherent view of the containers. Each label contains a transaction ID that monotonically increases at each configuration change of volume. A consistency label set (CLS) algorithm provides a means for removing any disks that are "out-of-date" relative to other disks in a common container. The CLS algorithm is described in U.S. patent application Ser. No. 10/105,872 titled RAID Assimilation Method and Apparatus, which patent application is hereby incorporated by reference as though fully set forth herein.

The CLS algorithm is capable of resolving partitions within a data set (plex), but not partitions between plexes and, in particular, cannot distinguish the case in which a plex was partitioned and has returned concurrent with the loss of its sibling. Each plex has a relationship to its containing mirror and this state is reflected in the label. The state of the mirror is a combination of the relationship states and any active work that is being done to resynchronize a plex with the volume state. When a plex is instantiated during the assimilation process, the disk's label indicates the relationship state of a "sibling" plex, if one exists.

Mirror voting provides a facility to resolve a situation wherein (i) only one plex in a volume is assimilated, (ii) the labels indicate that the plex is a member in a 2-plex mirror, (iii) both the assimilated plex and the second (missing) plex were active members of the mirror, and (iv) it is not clear whether the assimilated plex is more or less up-to-date than the missing plex. Each of these conditions can be determined with the existing disk label format. The mirror voting facility comprises a mirror vote record contains information identifying the volume, contained active plexes, and transaction number. Specifically, the vote record contains a count on the total number of plexes and the active number of plexes for a mirrored volume. The volume is identified by its unique file system ID and its creation time, both of which are kept in the on-disk labels. Plexes are identified by their volume-relative ID and by their creation time.

Resolution of the up-to-date conflict cannot occur without an additional vote, i.e., information "outside" of the two plexes that indicates the up-to-date status. The mirror vote facility provides a mechanism to store and retrieve that outside vote, e.g., a third vote in a 2-plex mirror. The storage system provides that third vote; the storage system stores a collection of votes associated with the set of active (and recently active but unreachable) volumes. The illustrative implementation of mirror voting uses the cluster mailbox disks to store the mirror vote set for a storage system. The CFO monitor provides an API to read a "plex blob" that contains the mirror vote records. The CFO monitor is unaware of the semantic contents of the blob.

Figure 6:
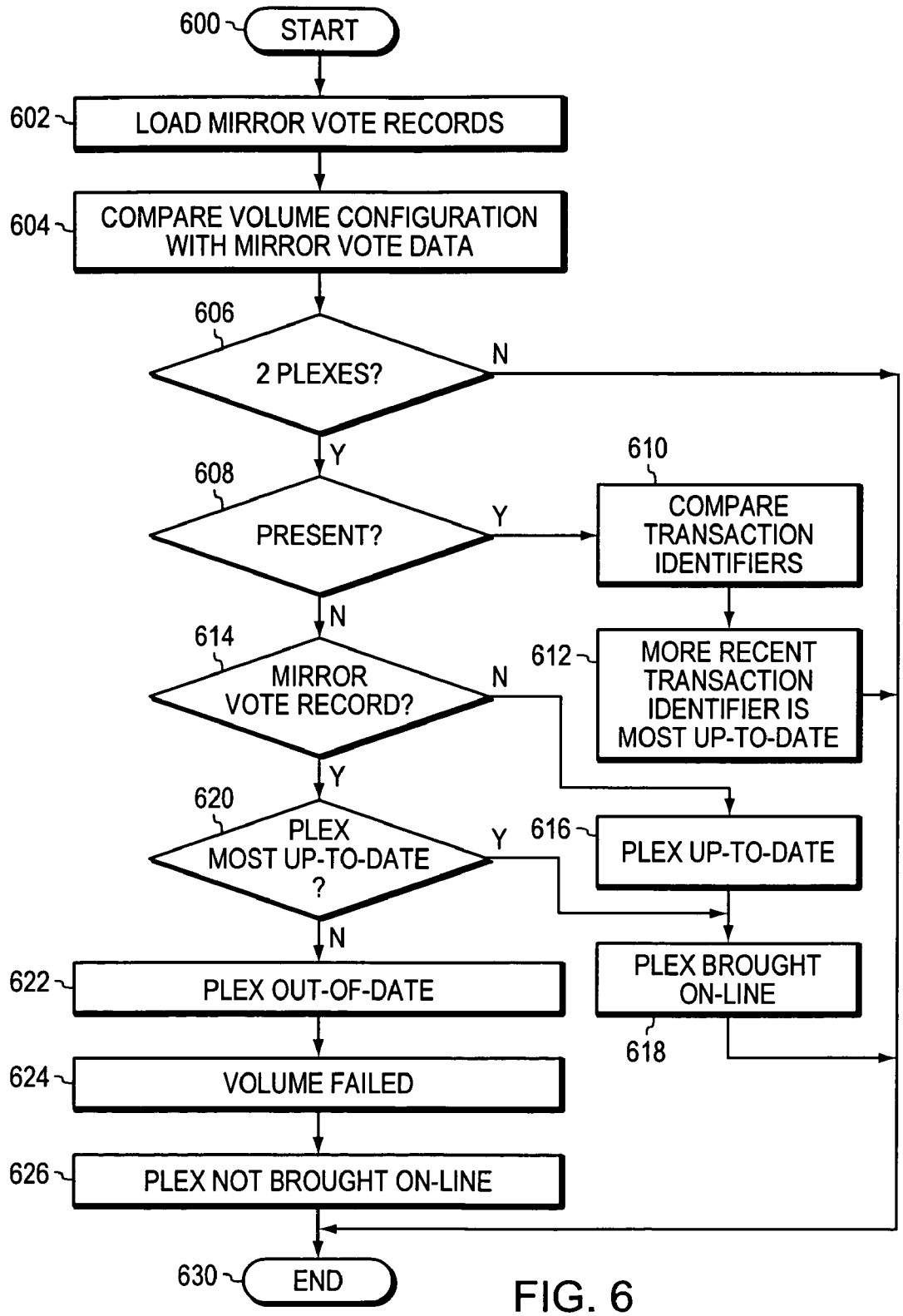
FIG. 6 is a flowchart illustrating a sequence of steps used to invoke mirror voting in accordance with the present invention.

FIG. 6 is a flowchart illustrating a sequence of steps used to invoke mirror voting in accordance with the present invention. Mirror voting is invoked initially as a final component of assimilation (both boot-time and dynamic). The sequence starts at Step 600 and proceeds to Step 602 where the persistent mirror vote records are loaded from the cluster mailboxes. In Step 604, the configuration tree of an assimilated volume is compared with the mirror vote data. In other words, the mirror configuration and plex identities are compared with the mirror vote plex data.

In Step 606, a determination is made as to whether the volume contains two plexes. If not, the sequence ends at Step 630. If the volume contains two plexes, in Step 608 a determination is made as to whether both plexes are present. If so, their transaction identifiers are compared in Step 610. The transaction identifier that is more recent than the other is considered most-up-to-date (Step 612). The sequence then ends at Step 630. If the volume contains two plexes but only one is present, a determination is made in Step 614 as to whether a mirror vote record is found. Note that the mirror vote record is used to determine whether the plex is most-up-to-date. If no mirror vote record is found, the plex is assumed to be most-up-to-date in Step 616 and is brought online in Step 618. The sequence then ends at Step 630.

If a mirror vote record is found, a determination is made in Step 620 as to whether the record indicates that the plex is most-up-to-date. If so, the plex is brought online in Step 618 and the sequence ends at Step 630. However, if the mirror vote record indicates that the plex is not most-up-to-date, the plex is marked as out-of-date in Step 622, the volume is marked as failed in Step 624 and the plex is not brought online in Step 626. The sequence then ends at Step 630. Note that, in the illustrative embodiment, the FSM 430 marks the plex out-of-date. Once a plex is marked out-of-date, only three events may occur that will alter its state (i) the disks associated with the out-of-date plex are removed, (ii) the disks associated with the up-to-date plex are inserted, or (iii) the out-of-date plex is split from the volume. When a plex is marked out-of-date, it is treated as an offline plex, i.e., no label write operations may take place on an out-of-date plex.

The use of a mirrored volume together with mirror voting can be applied to the CFO configuration to thereby provide a disaster recovery technique in accordance with the present invention. This technique further includes a volume name conflict resolution aspect of the invention that addresses an assimilation issue involving reattachment of two plexes of the mirrored volume (functioning as separate volumes) and determining the names of these two plexes (volumes) in a consistent manner. That is, upon reboot of the system, this aspect of the invention prevents "flipping" of the names among the plexes that are brought together by essentially renaming one of the plexes (volumes).

Assume that the CFO configuration is enhanced to include mirroring at the volume level. As previously discussed, storage system S1 has a mirrored volume configuration including V1P1 and V1P2. According to the definition of mirroring, a system administrator is able to take one of the plexes (V1P1 or V1P2) offline for, e.g., periodic maintenance. As a result, the mailbox mechanism must be extended to both copies of the plexes associated with the mirrored volume so that the partner system in a CFO configuration is able to determine whether the other storage system is functioning or is failed (as previously discussed). The mailbox data is thus mirrored between the two plex copies of the mirrored volume. The partner system reads the messages stored in both mirrored mailbox copies and, using the sequence numbers contained within the messages, determines which copy is more recent and therefore more current. This can be extended to make a determination as to whether the messages exchanged over the cluster interconnect are more recent than the messages exchanged through the storage mailbox mechanism.

Although a mailbox model using shared storage is illustratively described, it is understood that alternative mailbox models may be used in accordance with the teachings described herein. One such alternative model includes the use of third-party arbitrated cluster mechanisms. The nature of the present invention allows for the use of other mechanisms provided that they satisfy the ability to store the encapsulated mirror vote data and are capable of disambiguating instances of the cluster mailbox information and associated mirror vote data upon cluster healing.

As noted, messages embodied as packets contain similar information, including the sequence numbers. The disk mailbox mechanisms include information that enables them to resolve conflicts with respect to the most current copy of the data. This is particularly relevant with respect to mirror voting. There are preferably pairs of mailbox disks for each plex (e.g., VBN 0 on a data disk and the parity disk associated with that disk). Each storage system maintains a set of monotonically increasing (incrementing) sequence numbers. Thus, system S1 transmits its messages using its incremented sequence numbers, while S2 transmits its messages using its incremented sequence numbers. Each storage system maintains state with respect to its partner's latest sequence number. Since each storage system writes to pairs of disks in each plex of the mirrored volume, instead of a typical 4-disk mailbox arrangement, the mirrored volume CFO configuration used for disaster recovery utilizes an 8-disk mailbox mechanism.

A problem associated with extending the CFO cluster for disaster recovery purposes is that a complete communication failure may occur between the two nodes, e.g., the storage (V1P1 and V2P2) co-located to S1 and the storage (V2P1 and V1P2) co-located to S2. If a complete communication failure arises, the mirrored mailbox mechanism may be utilized to determine that the storage co-located to a storage system is unavailable. This situation is different from a scenario where a system "dies" and its surviving partner can still access all of the disks in the storage network. Assuming this latter situation arises and there is not a complete failure of the communication network, the surviving storage system "assumes the identity" of the failed storage system to enable continued storage service. The surviving system assumes the identity of the failed system in a conventional CFO manner (i.e., takes over the network addresses and storage system service for clients served by the failed system).

However, the disaster recovery technique of the present invention is directed to (i) a complete communications failure between the nodes and (ii) a complete site failure of one of the nodes. A site failure may be transient or permanent, and the CFO monitor cannot distinguish between the two types of failures. Therefore, if either (i) or (ii) scenario arises and it is determined that there is complete communication failure between the two nodes, then the operator may choose to either declare a failure and force a takeover of the non-responding storage system or leave the situation "as is". The operator declares a failure and forces a disaster scenario takeover if it is determined that the failure is permanent and it is desirable to have the clients failover to the surviving storage system.

A permanent failure is identified by, e.g., an operator making a call to the failed site to confirm the permanent failure. If a permanent failure is declared, then a decision is made that all of the data located at the failed site is invalid and only the data (and storage) coupled to the surviving node/site is able to move forward. Thereafter, when the failed site (node) is restored, the data at the failed site must be resynchronized with the data at the surviving site in accordance with a mirror resynchronization operation.

The present invention is directed to a technique that includes a set of procedures utilized during the transfer of service of a failed storage system to a surviving storage system of a CFO configuration during a system outage, such as a disaster scenario. The procedures are executed by the RAID subsystem of the surviving storage system during disaster takeover, storage healing and node restart operations. Broadly stated, in the disaster scenario, the RAID subsystem of the surviving storage system splits the surviving data sets of the failed system to allow an operator the ability to compare data sets subsequent to healing of the disaster.

To that end, the RAID subsystem assigns a new name to each taken-over volume instance to prevent recombination subsequent to storage healing. The subsystem also retains the state associated with individual volumes that existed prior to the disaster; the state includes volume name, snapshot information associated with in-progress asynchronous mirroring data transfers and online/offline/restricted state. The root volume of the failed system must also be brought online regardless of its state in order to complete a successful disaster takeover. Moreover, the RAID subsystem invalidates client handles that are currently in use, forcing all clients to remount. Alternatively, an option is to disable this capability in environments that do not require strict data integrity, e.g., web hosting.

Subsequent to the disaster, the cluster undergoes a healing process that may involve either a gradual restoration of service or a complete restoration of service to the failed system site. Resources are preferably given back to the failed system under operator control, although this behavior may be altered. Storage healing, in this context, denotes that when the failed data set co-located with the failed system is healed, it is not made available to clients without operator intervention. In other words, clients are not allowed to transparently access data that is out-of-date relative to the copy of the data that survived the disaster. The failed data set is preferably marked out-of-date subsequent to healing. In addition, the system is able to select the correct root volume (from the surviving data set) given the choice of two possible root volumes (the surviving data set and the "now-healed" failed data set). Furthermore, the original surviving data set is assigned a base ordinal in order to prevent an unexpected renaming of the data set (in the event the failed data set reappears) and a naming conflict that may result in client interruption.

Since the CFO monitor 360 cannot on its own determine whether a permanent failure has occurred, an option command is provided for an operator to force a take over to occur. In accordance with this forced takeover command, data is written to the mailbox disks of the surviving storage system to denote that a takeover has occurred. In addition, information is written to the plexes of the surviving system to denote that they now form a canonical data set and, if the failed system plex were to reappear, its data set is not allowed to join the canonical data set. Furthermore, the failed storage system is not allowed to reappear with the identity that it assumed previously. These restrictions are needed to ensure that clients do not attached to the failed storage system and, more specifically, to the data served by the failed system only to discover that that data is stale (out-of-date). Note also that it is assumed that despite a node/site failure, clients are still able to access the surviving storage system over the network cloud 105.

Figure 7:
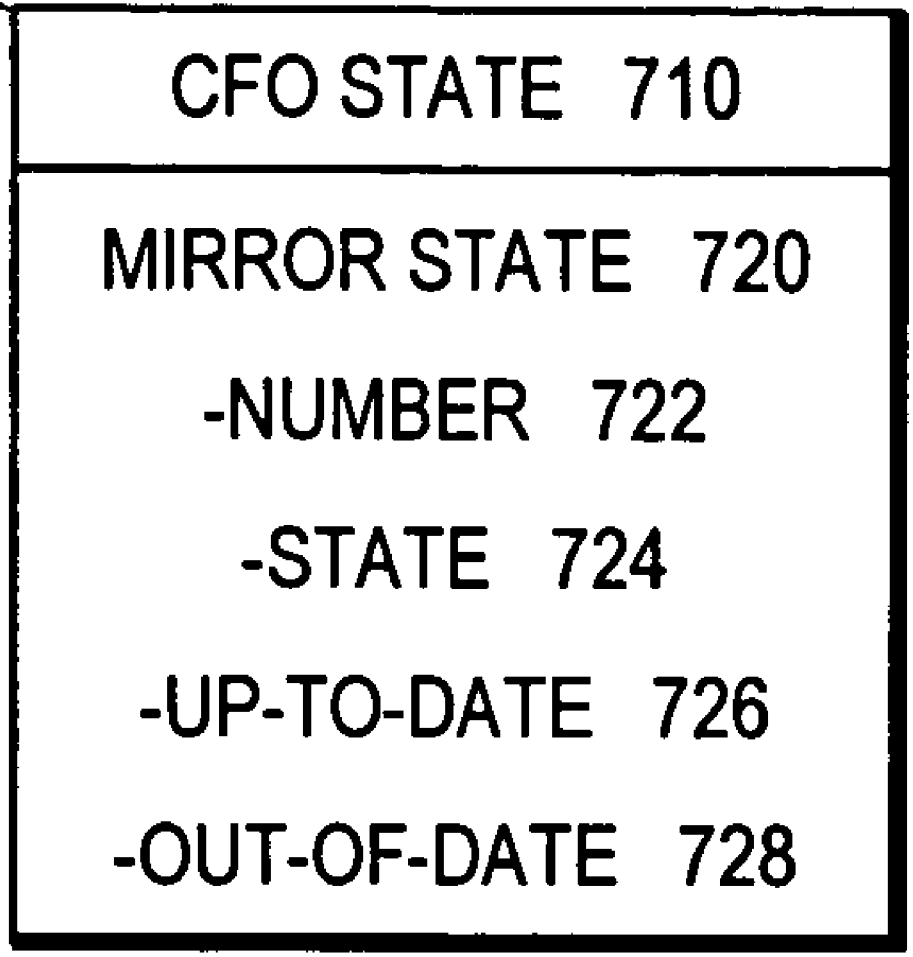
FIG. 7 is a schematic block diagram illustrating the format of a block on a mailbox disk of the storage system.

Thus, an aspect of the invention is directed to preventing the failed storage system from reappearing and reassuming its previous identity. This inventive aspect is addressed by writing information to the block(s) used to store the mailbox data. FIG. 7 is a schematic block diagram illustrating the format of a block 700 on the mailbox disk. One portion of the block contains CFO state 710 and another portion of the block contains mirror state 720, the contents of which indicates (for every mirrored volume) the number 722 of plexes in the mirrored volume, the state 724 of the plexes at the time the block is written and which plex contains data that is up-to-date 726. Note that the state of the plexes indicates which plex is a surviving plex. Therefore, if the storage attached to S1 constitutes a failed site, then the surviving system S2 has surviving plexes V2P1 and V1P2, and the information contained in the mirror state reflects that status. In this case, system S2 writes the contents of the mailbox disk block to reflect the status of the surviving plexes, particularly for the purposes of system S1 when (and if) it reappears.

If S1 reappears and S2 has assumed the identity of S1 and communication between the systems has been severed, there is no way to make S1 "go back down" until the communication path is restored. In theory, S1 can reappear and begin serving stale data to its clients. This disaster approach to cluster failover (CFOD) requires that S1 be maintained offline until communication is reestablished between S1 and S2. The mirror state information contained in the mailbox blocks on the volume plexes coupled to surviving filer S2 is sufficient to keep failed system S1 (when it reappears) from serving stale data to its clients. Therefore, information is written into the mirror state of the mailbox disk block that indicates that the volume plexes connected to the failed system S1 contains information that is out-of-date 728. The blocks on the cluster mailboxes have fields for storing state that indicates when the cluster mailbox state is itself out-of-date. A mirror manager process 450 utilizes the CFO monitor 360 to write through information pertaining to the state of the mirrored volumes, along with the mailbox mechanisms.

When the CFO configuration 100 boots and all eight mailbox disks are located, a determination is made as to which of the mailboxes are the most up-to-date. As a result of communication and system failures, there may be differing views as to the state of the cluster mailbox mechanisms. The mirror manager process 450 relies on the CFO monitor to determine which copy of its data is valid, or at least most recent. Based on that determination, the mirror manager 450 examines the mirrored volumes and determines which plexes are accessible and which, if any, are up-to-date. The manager 450 then takes action on the RAID configurations by, e.g., marking the out-of-date plexes as such or bringing the up-to-date plexes online.

As a result of the CFOD described above, the failed plex associated with the failed site is permanently removed from the configuration. This permanent "knock-out" ensures that if a failed plex reappears, it will never be recombined with the surviving plex of the mirrored volume. When the failed plex reappears, it is rewritten to create a volume that is separate from the surviving plex volume. The surviving plex appears as a mirrored volume with only one plex (a degraded mirror) and a second plex may be added to the surviving plex to create a subsequent mirrored volume upon synchronization of the data sets. When the failed site reappears, it does not reassume its previous identity.

Figure 8:
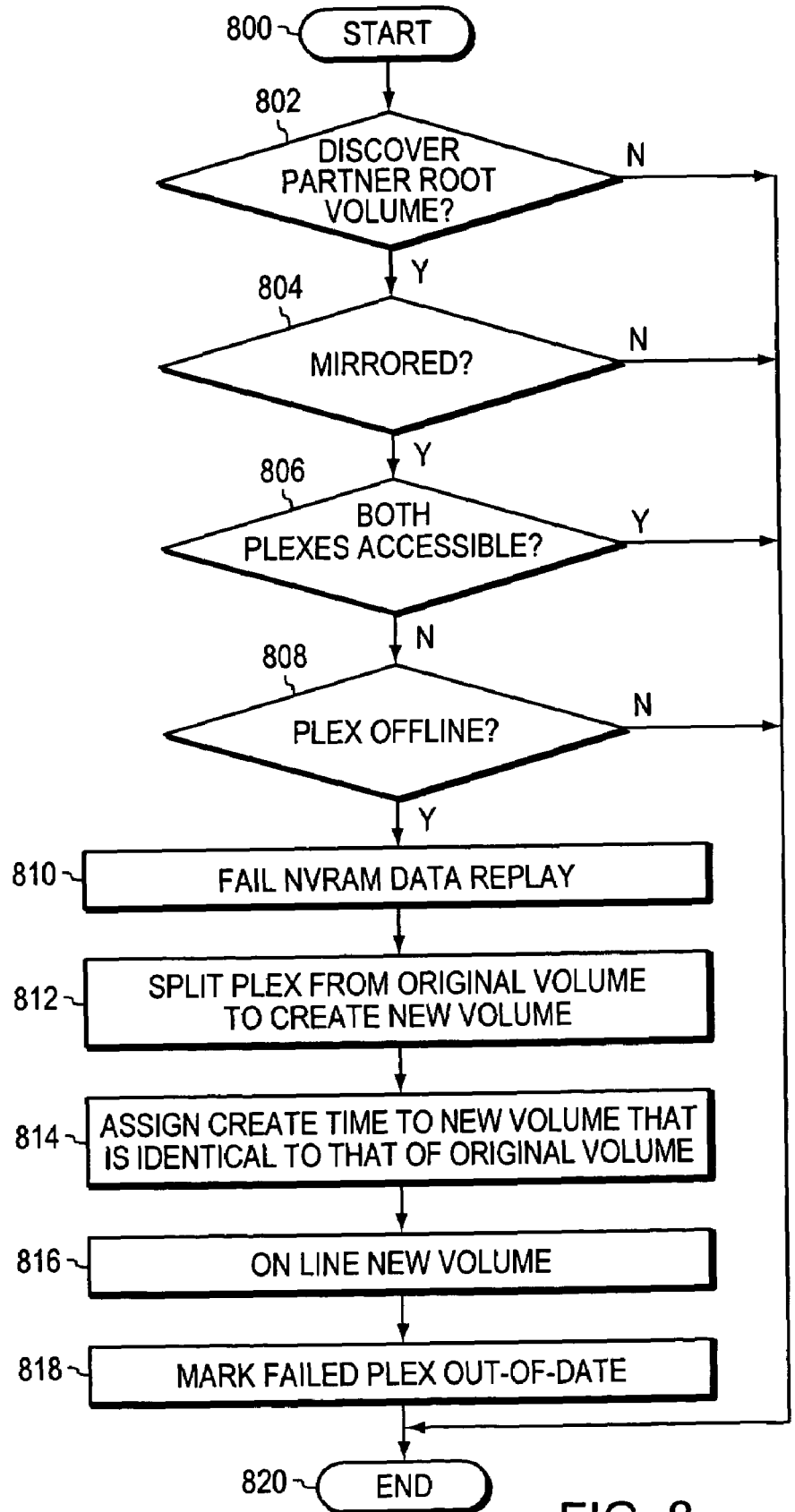
FIG. 8 is a flow chart illustrating a first sequence of steps in accordance with a disaster takeover procedure of the present invention.

FIG. 8 is a flow chart illustrating a first sequence of steps in accordance with a disaster takeover procedure of the present invention. At the time a disaster is declared by an operator (through a user command) the surviving storage system has access to some or none of the failed system's (partner's) data, which may be mirrored or non-mirrored. The sequence starts at Step 800 and proceeds to Step 802 where subsequent to the assimilation of partner volumes, but prior to the initialization of storage services, a determination is made as to whether a partner root volume is discovered. If not, the sequence ends at Step 820. If a partner root volume is discovered, then in Step 804 a determination is made as to whether the partner root volume is mirrored. If not, the sequence ends at Step 820. If it is determined that the partner root volume is mirrored, then in Step 806, a determination is made as to whether both plexes are accessible. If so, then the sequence ends at Step 820.

If only one plex of the mirror volume is accessible, a determination is made in Step 808 as to whether the accessible plex is marked offline. If not, then the sequence ends at Step 820. However, if the accessible plex is marked offline, then replay of NVRAM data fails in Step 810 and, in Step 812, the accessible plex is forcibly split from its original volume to thereby form a new volume. In Step 814, the new volume is assigned a create time that is identical to the original volume and, in Step 816, the new volume/plex is onlined in order to prevent subsequent takeover processing failures. As a consequence, the failed plex is marked out-of-date relative to mirror voting in Step 818 and the sequence ends at Step 820.

Figure 9:
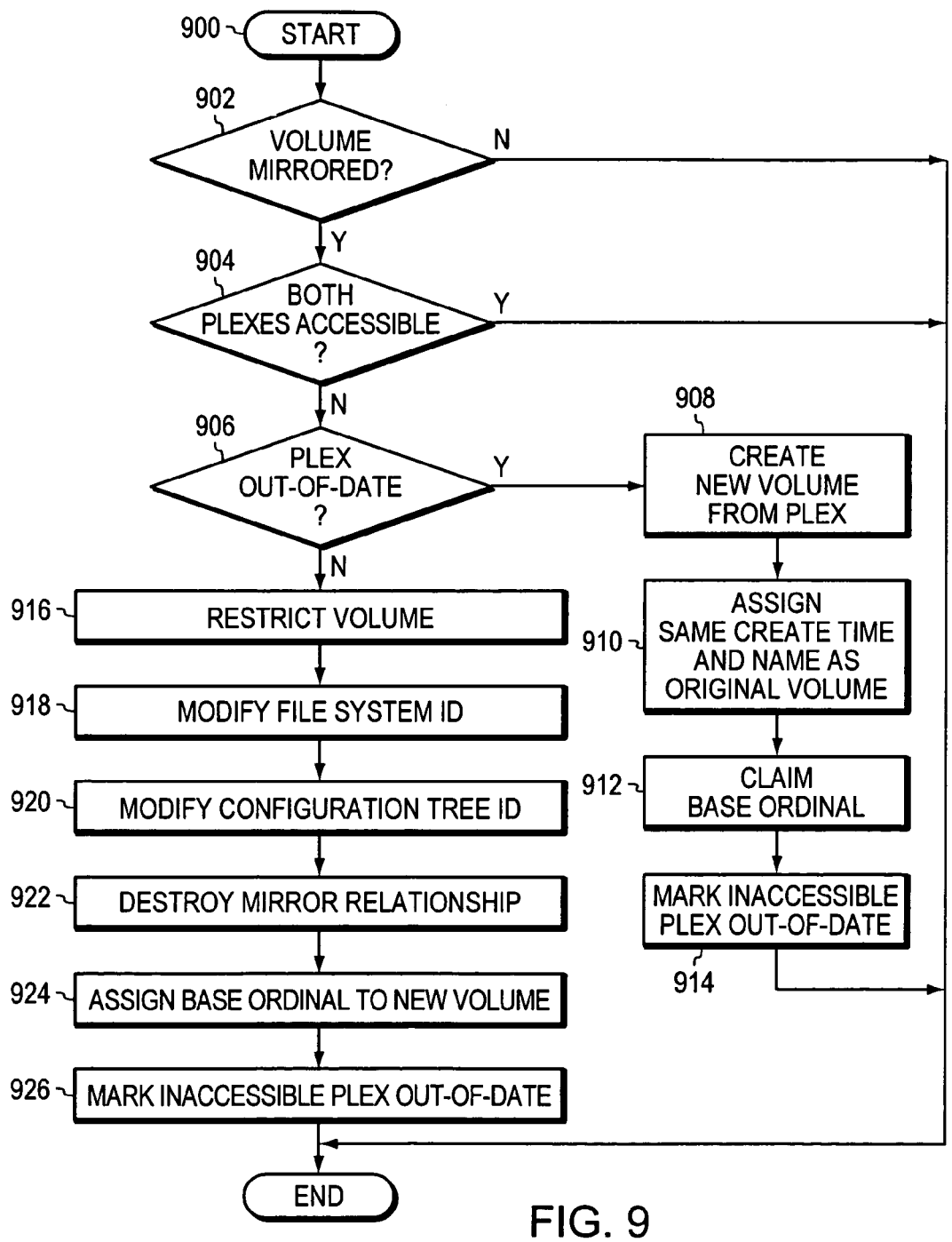
FIG. 9 is a flow chart illustrating a second sequence of steps in accordance with the disaster takeover procedure of the present invention.

FIG. 9 is a flow chart illustrating a second sequence of steps in accordance with the disaster takeover procedure of the present invention. This sequence takes place for each partner volume and subsequent to the replay of file system NVRAM data, which is necessary to ensure the data consistency and integrity of the surviving partner data sets. The sequence starts at Step 900 and proceeds to Step 902 where a determination is made as to whether the volume is mirrored. If not, then the sequence ends at Step 930. If the volume is mirrored, a determination is made in Step 904 as to whether both plexes are accessible. If so, then the sequence ends at Step 930. However, if only one plex is accessible, a determination is made in Step 906 as to whether the plex is marked as out-of-date. If so, then the accessible plex is split from its original volume to thereby form a new volume in Step 908. In Step 910, the new volume is assigned the same create time and name as the original volume and, in Step 912, the new volume claims a base ordinal, as described further herein. In Step 914, the inaccessible plex is marked out-of-date relative to mirror voting and the sequence ends at Step 930.

On the other hand, if the accessible plex is believed to be up-to-date based on mirror voting, then the volume is restricted in Step 916, thereby removing its file system state and, in Step 918, the file system ID is modified, thus invalidating outstanding client handles. In Step 920, a configuration tree ID is modified, thereby preventing subsequent assimilation into a common volume with the plex that is no longer accessible and, in Step 922, the mirror relationship between the two volumes is destroyed by, e.g., forcing a split of the two plexes into separate volumes. Since both volumes have the same names and create times, the new volume representing the surviving plex is assigned the base ordinal in Step 924, using the ordinal claim label mechanism described herein. In Step 926, the inaccessible plex is marked out-of-date relative to mirror voting and the sequence ends at Step 930.

Figure 10:
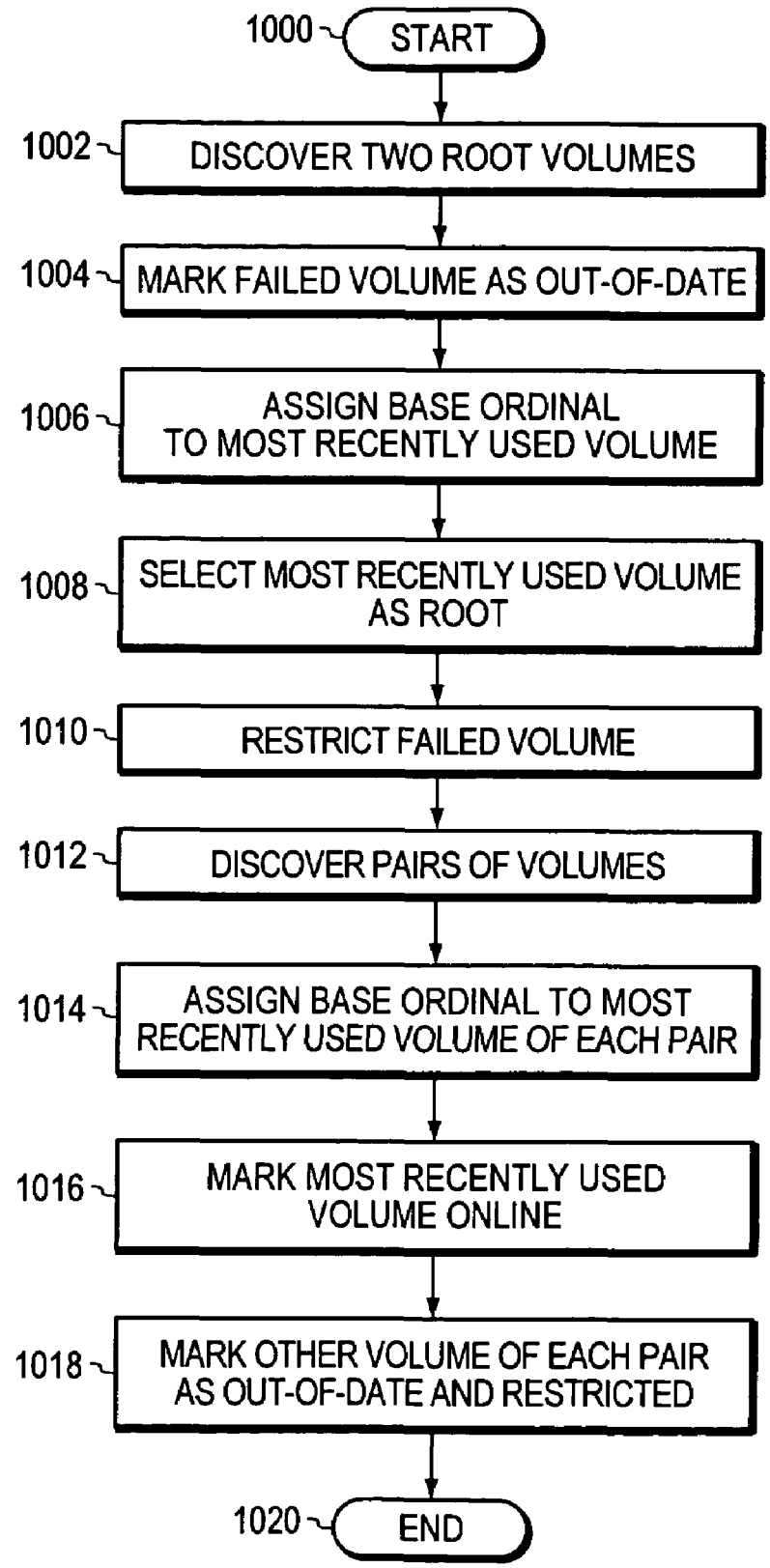
FIG. 10 is a flow chart illustrating a sequence of steps in accordance with a healing procedure of the present invention.

As a consequence of the disaster takeover procedures described above, certain actions take place on the healing of the storage subsystem. FIG. 10 is a flow chart illustrating a sequence of steps in accordance with a healing procedure of the present invention. The sequence starts at Step 1000 and proceeds to Step 1002 where the system discovers two root volumes having identical names and creation times. In Step 1004 one volume, representing the partner's data set that did not survive the original disaster (the failed volume) is marked as out-of-date due to the mirror voting updates that were made during the disaster takeover. In Step 1006, the most recently used root volume is assigned the base ordinal and, in Step 1008, this volume is selected as root whereas, in Step 1010, the other root volume is restricted. In Step 1012, the system subsequently discovers pairs of volumes with identical names and creation times. In Step 1014, the most recently used volume of each pair is assigned the base ordinal name and, in Step 1016, that volume is marked online. In Step 1018, the other volume is marked as out-of-date and is restricted. Therefore, the overall effect on healing is that clients have uninterrupted access to data sets that survived the initial disaster, while both partner mirrored data sets (the set that survived the disaster and the set that failed) are available for inspection and repair. The sequence then ends at Step 1020.

When the failed plex (which has been converted into a new volume) reappears during the disaster takeover procedure, it is initially assigned the same volume name as the surviving plex, thereby creating a name conflict. According to the inventive technique, the RAID subsystem resolves the conflict in which two separate volumes have the same distinguishing name using a volume name conflict resolution procedure. The conflict resolution procedure ensures that the reappearing plex (data set) is uniquely renamed in a manner that is consistent with the previous volume name. In addition, the procedure guarantees that the result of the name conflict resolution is consistent across reboot operations of the storage system. The procedure may also be used to determine the root volume of the RAID subsystem under certain circumstances, such as where the root volume is mirrored, hasn't changed names subsequent to the forced split and, upon healing, continues to share identical create times with other volume.

During initial incorporation of volumes into the system (assimilation) disk labels are read and the CLS algorithm is used to sort disks into volumes. Each volume has a name that is a component of the label data and is the initial name setting for the volume. Once all volumes have been loaded, the conflict resolution procedure determines whether there are any name conflicts. According to the invention, volume naming is accomplished through the use of ordinals. Each volume is assigned an ordinality value that defines the resolved ordering of named conflicts among two or more volumes. Initially, each volume is assigned an ordinality of zero. The conflict resolution procedure implements a coarse volume precedence scheme based on the state of the volume.

If two or more volumes at the same precedence level have conflicting names, an ordinal claim value is used as a tie-breaker. The ordinal claim is a time stamp that indicates the point in time when the volume most recently claimed the base (0) ordinal. The volume with the most recent ordinal claim is given precedence over volumes with less recent claims. The remaining volumes are assigned ordinals in a monotonically increasing order according to precedence. For example, the volume with the base ordinal is assigned zero, the volume with the next highest precedence is assigned 1, and so on. Illustratively, the volume assigned ordinal 0 takes the base name of the volume, while each of the other volumes use their assigned ordinal together with the base name.

Specifically, the ordinal value is used to create a name suffix that, in combination with the name of the volume, is used to project a unique name for the volume. For example, volume vol0 with ordinal 0 is given the name "vol0", volume vol0 with ordinal 1 is given the name "vol0(1)" and vol0 with ordinal 2 is given the name "vol0(2)". Volumes with named suffixes are treated identically from a configuration standpoint as volumes that do not have suffixes. Once ordinals have been assigned during system boot, the assignment is not revoked until the storage system has rebooted. This prevents the name of a volume from changing outside of operator control while the system is running. In the illustrative embodiment of the CFO system configuration, the assignment of ordinals occurs on a per-system basis. A volume of one CFO storage system may share a name with a volume on the other CFO storage system without requiring the use of the procedures described herein.

For purposes of description, one suffix scheme "(N)" is illustratively presented, although other suffix schemes may be used in accordance with the present invention. Examples of other suffix schemes include the use of letters or strings of letters, or numbers with other encodings (for example, N) provided that the conversion of integer ordinal values to the derived suffix is unique. In other words, given an integer ordinal value N, it must be ensured that the encoding E (N) is unique for all values of N.

When the unique volume names, including the assigned ordinals, are exported to an operator (via a user interface) or to a client (via a share that can be mounted), it must be ensured that these names are consistent across configuration change or reboot operations. The present invention ensures such consistency by persistently storing the unique names of the renamed volumes (i.e., the ordinal claim data) within label (CLS) state information stored on the volume to maintain that consistency. Each time a label is updated for a volume with a base ordinal setting, the ordinal claim data is updated to the current system time stamp. By storing the ordinal name assignments within the labels of disks, the naming assignment is persistently stored across reboot and configuration management (changes) operations. This ensures that in the case of multiple volumes having the name, the ordinal assignments are maintained.

Advantageously, the procedures described herein prevent the possibility that clients accessing the storage system will "see" out-of-date versions of the data either during transfer of service of the system during the disaster scenario or subsequently after the storage system is healed and service on the failed system has been restored. To that end, the inventive technique defends against silent access to out-of-date data subsequent to a disaster takeover, while providing continuity in the naming and identity of the surviving data set. Ordinal assignment of a volume is dynamic, persistent across reboot operations through the use of an ordinal claim and precedence settings provide a deterministic method for determining ordinal assignment. Mirroring operations continue uninterrupted if the surviving data set is up-to-date sufficient to resynchronize with potential source and target mirrors. In addition, healing of the storage subsystem instantiates both the surviving and failed data sets for comparison and resolution of conflicts. The inventive technique described herein handles partial failures of the storage system, i.e., handles partial or complete loss of the storage connection between the systems.

While there has been shown and described an illustrative embodiment for transferring service of a failed storage system during a disaster scenario in a CFO configuration, it is to be understood that various other adaptations and modifications may be made within the spirit and scope of the invention. For example, in an alternate embodiment, the mirrored volumes associated with the clustered systems' volumes may be located at a third site that is remote from both of the clustered node sites. This aspect provides not only logical mirroring at a RAID level implementation but also a backend tier to hierarchical storage. In such a configuration, the remote mirror site illustratively stores a canonical copy of the data and the storage co-located to the storage system sites essentially function as caches of that data. In this case, a graceful resynchronization between the system node sites may occur by writing the more recent data on the surviving storage system back to the remote mirror site and then reloading that data onto the failed site when it is restored. However, an issue still arises with respect to resynchronization and, in particular, not bringing the failed storage system site online until it has resynchronized with the canonical copy of the data set at the remote mirror site.

A preferred embodiment of the invention has been described herein with reference to a file server having a storage operating system with a file system layer and a RAID subsystem (among other components), which manages file semantics in order to access data organized in files. It should be understood, however, that the invention can be practiced in any system or device that transfers service of a failed storage system during a disaster scenario. One type of system or device in which the invention can be embodied is designed to perform a data storage function, and if so, may perform data-related operations, e.g., in response to data access requests. Such requests may use file-based and/or block-based semantics, depending on the implementation and, correspondingly, the system or device may organize data in files or in another manner. Moreover, such systems and devices may or may not incorporate features and functions described herein, such as, for example, a file system layer or a RAID subsystem, or may combine or otherwise modify their operation, without departing from the principles of the invention. Finally, the invention has been described herein using nomenclature such as "permanent knockout" which may appear to be specific to implementations of the invention providing RAID functionality; however, the invention in its broader sense is not so limited.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for operating a computerized data storage system, comprising:

operating a first computer and a second computer, the first computer assigned to a first set of data and the second computer assigned to a second set of data;

maintaining two copies of the first set of data, a first copy of the two copies stored on a first set of disks and a second copy of the two copies stored on a second set of disks;

maintaining two copies of the second set of data, a first copy of the two copies stored on the first set of disks and a second copy of the two copies stored on the second set of disks;

writing, each time that a data is written by the first computer, a label to the first set of disks and to the second set of disks, the label having fields for a status of each computer of the two computers, a first ordinal which is increased each time that a new data is written, and a time stamp giving a time at which the last write was performed;

after failure of a computer of the two computers, making, in response to reading the labels of the first set of disks and the second set of disks, a determination by a surviving computer of the two computers as to the most up to date copy of the data assigned to a failed computer of the two computers; and writing a new data to the most up to date copy of the first set of data and the second set of data by the surviving computer.

2. The method of claim 1, further comprising:

writing, each time that a data is written by the second computer, a label to the first set of disks and to the second set of disks, the label having fields for a status of each computer of the two computers, a second ordinal which is increased each time that a new data is written, and a time stamp giving a time at which the last write was performed.

3. The method as in claim 1, further comprising:

after a repair of a failed computer, determining, in response to the label, the most up to date copy of data of the set of data assigned to the repaired computer;

returning the repaired computer to servicing the most up to date copy of the data.

4. The method of claim 3, further comprising:

determining if the most up to date copy of the data is online; and marking, in response to the most up to date copy of the data being not on line, the up to date copy of the data as a failed system.

5. The method as in claim 1, wherein making the determination by a surviving computer of the two computers as to the most up to date copy of the data, further comprises:

making a first determination by the surviving computer as to the most up to date copy of the data by examining the ordinal, and in the event of a tie between two copies of the data, using the time stamp to determine a most up to date copy of the data assigned to the failed computer.

6. An apparatus to operate a computerized data storage system, comprising:

means for operating a first computer and a second computer, the first computer assigned to a first set of data and the second computer assigned to a second set of data;

means for maintaining two copies of the first set of data, a first copy of the two copies stored on a first set of disks and a second copy of the two copies stored on a second set of disks;

means for maintaining two copies of the second set of data, a first copy of the two copies stored on the first set of disks and a second copy of the two copies stored on the second set of disks;

means for writing, each time that a data is written by the first computer, a label to the first set of disks and to the second set of disks, the label having fields for a status of each computer of the two computers, a first ordinal which is increased each time that a new data is written, and a time stamp giving a time at which the last write was performed;

after failure of a computer of the two computers, means for making, in response to reading the labels of the first set of disks and the second set of disks, a determination by a surviving computer of the two computers as to the most up to date copy of the data assigned to a failed computer of the two computers; and means for writing a new data to the most up to date copy of the first set of data and the second set of data by the surviving computer.

7. The apparatus of claim 6, further comprising:

means for writing, each time that a data is written by the second computer, a label to the first set of disks and to the second set of disks, the label having fields for a status of each computer of the two computers, a second ordinal which is increased each time that a new data is written, and a time stamp giving a time at which the last write was performed.

8. The apparatus as in claim 6, further comprising:

after a repair of a failed computer, means for determining, in response to the label, the most up to date copy of data of the set of data assigned to the repaired computer;

means for returning the repaired computer to servicing the most up to date copy of the data.

9. The apparatus of claim 8, further comprising:

means for determining if the most up to date copy of the data is online; and means for marking, in response to the most up to date copy of the data being not on line, the up to date copy of the data as a failed system.

10. The apparatus as in claim 6, wherein making the determination by a surviving computer of the two computers as to the most up to date copy of the data, further comprises:

means for making a first determination by the surviving computer as to the most up to date copy of the data by examining the ordinal, and in the event of a tie between two copies of the data, means for using the time stamp to determine a most up to date copy of the data assigned to the failed computer.

11. An apparatus to operate a computerized data storage system, comprising:

a first computer and a second computer, the first computer assigned to a first set of data and the second computer assigned to a second set of data;

two copies of the first set of data, a first copy of the two copies stored on a first set of disks and a second copy of the two copies stored on a second set of disks;

two copies of the second set of data, a first copy of the two copies stored on the first set of disks and a second copy of the two copies stored on the second set of disks;

a first processor to write, each time that a data is written by the first computer, a label to the first set of disks and to the second set of disks, the label having fields for a status of each computer of the two computers, a first ordinal which is increased each time that a new data is written, and a time stamp giving a time at which the last write was performed;

after failure of a computer of the two computers, a processor of the surviving computer to determine, in response to reading the labels of the first set of disks and the second set of disks, the most up to date copy of the data assigned to a failed computer of the two computers; and the surviving computer to write a new data to the most up to date copy of the first set of data and the second set of data.

12. The apparatus of claim 11, further comprising:

a second processor to write, each time that a data is written by the second computer, a label to the first set of disks and to the second set of disks, the label having fields for a status of each computer of the two computers, a second ordinal which is increased each time that a new data is written, and a time stamp giving a time at which the last write was performed.

13. The apparatus as in claim 11, further comprising:

after a repair of a failed computer to make a repaired computer, the repaired computer to determine, in response to the label, the most up to date copy of data of the set of data assigned to the repaired computer; and the repaired computer then returned to service the most up to date copy of the data.

14. The apparatus of claim 11, further comprising:

the repaired computer to determine if the most up to date copy of the data is online; and the repaired computer, in response to the most up to date copy of the data being not on line, the up to date copy of the data as a failed system.

15. The apparatus as in claim 11, wherein making the determination by a surviving computer of the two computers as to the most up to date copy of the data, further comprises:

the surviving computer making a first determination as to the most up to date copy of the data by examining the ordinal, and in the event of a tie between two copies of the data, the surviving computer to use the time stamp to determine a most up to date copy of the data assigned to the failed computer.

16. A computer readable media, comprising:

said computer readable media containing instructions for execution on a processor for the practice of a method for operating a computerized data storage system, the method having the steps of, operating a first computer and a second computer, the first computer assigned to a first set of data and the second computer assigned to a second set of data;

maintaining two copies of the first set of data, a first copy of the two copies stored on a first set of disks and a second copy of the two copies stored on a second set of disks;

maintaining two copies of the second set of data, a first copy of the two copies stored on the first set of disks and a second copy of the two copies stored on the second set of disks;

writing, each time that a data is written by the first computer, a label to the first set of disks and to the second set of disks, the label having fields for a status of each computer of the two computers, a first ordinal which is increased each time that a new data is written, and a time stamp giving a time at which the last write was performed;

after failure of a computer of the two computers, making, in response to reading the labels of the first set of disks and the second set of disks, a determination by a surviving computer of the two computers as to the most up to date copy of the data assigned to a failed computer of the two computers; and writing a new data to the most up to date copy of the first set of data and the second set of data by the surviving computer.

* * * * *